United States Patent [19]

Most

[11] Patent Number: 4,744,573

[45] Date of Patent: May 17, 1988

[54] STEER HEAD ATTACHMENT FOR A TRICYCLE

[76] Inventor: Gordon Most, Box 49, Seneca, Nebr. 69161

[21] Appl. No.: 916,381

[22] Filed: Oct. 7, 1986

[51] Int. Cl.⁴ .......................... A63G 19/00; B62J 39/00
[52] U.S. Cl. .............................. 280/1.13; 280/289 H
[58] Field of Search .................. 280/1.1, 1.11 R, 1.13, 280/1.14, 1.16, 1.22, 289 H, 33.39 A; 296/78.1; 74/551.8

[56] References Cited

U.S. PATENT DOCUMENTS

| | | | |
|---|---|---|---|
| D. 164,758 | 10/1951 | Bader | D12/108 |
| D. 252,456 | 7/1979 | Phillips | D12/108 |
| 1,374,475 | 4/1921 | Shaughnessy | 296/78.1 |
| 2,484,954 | 10/1949 | Marasco | 280/1.13 |
| 2,578,682 | 12/1951 | Fernstrom | 280/289 H |
| 2,709,601 | 5/1955 | Goerditz | 280/1.13 X |
| 2,723,128 | 11/1955 | Kelly et al. | 280/1.13 X |
| 2,866,649 | 12/1958 | West | 280/1.13 X |
| 2,916,849 | 12/1959 | Lemelson | 280/1.22 X |
| 3,289,493 | 12/1966 | Church | 280/289 H |
| 3,462,188 | 8/1969 | Edgar | 280/289 H |
| 3,514,117 | 5/1970 | Olsen | 280/1.167 |

*Primary Examiner*—John A. Pekar
*Attorney, Agent, or Firm*—Zarley, McKee, Thomte, Voorhees & Sease

[57] ABSTRACT

A steer head attachment for a tricycle is described comprising a molded fiberglass or plastic shell having rearward and forward portions. The forward portion of the attachment has the appearance of a steer head and includes eyes, ears, nostril, and horns. The rearward end of the attachment is provided with a pair of spaced-apart clips which are adapted to be removably secured to the handlebars of the tricycle.

2 Claims, 2 Drawing Sheets

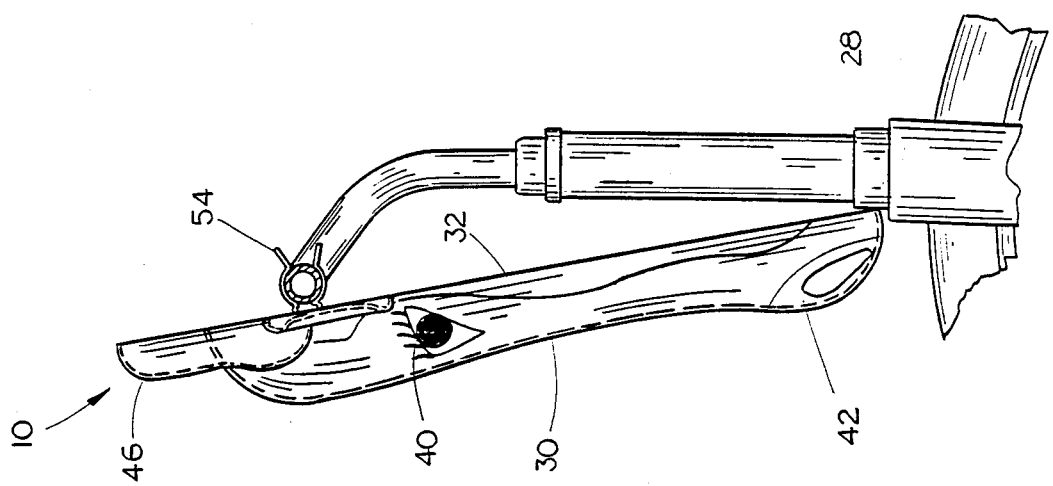
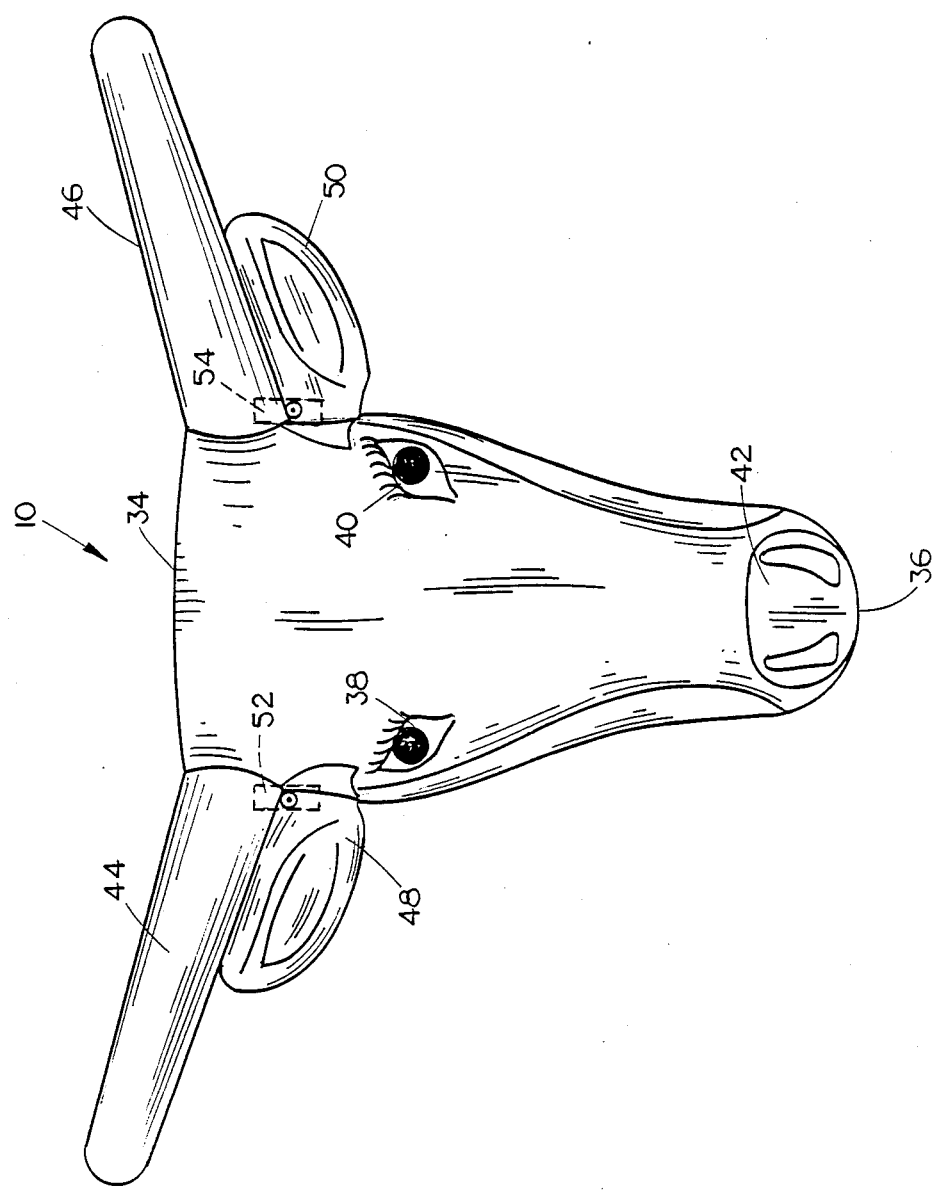
FIG. 4
FIG. 5

STEER HEAD ATTACHMENT FOR A TRICYCLE

BACKGROUND OF THE INVENTION

This invention relates to an ornamental attachment for a velocipede and more particularly to a steer head attachment for a tricycle.

Small children, especially those children in rural areas, generally have a fascination for farm animals such as cows, steers, horses, etc. Those same children normally experience considerable pleasure or enjoyment riding tricycles. It has been found that these small children enjoy riding a tricycle wherein a steer head attachment or the like is secured to the handlebars of the tricycle.

It is therefore a principal object of the invention to provide a bovine head attachment for a velocipede such as a tricycle or the like.

A further object of the invention is to provide a steer head attachment for a tricycle.

Yet another object of the invention is to prvide a steer head attachment for a tricycle which may be quickly and easily mounted thereon or removed therefrom.

Yet another object of the invention is to provide a steer head attachment for a tricycle which permits a child to envision that he is riding a steer or the like.

Still another object of the invention is to provide a device of the type described which is economical of manufacture, durable in use and refined in appearance.

These and other objects will be apparent to those skilled in the art.

BRIEF DESCRIPTION OF THE DRAWINGS

FIG. 4 is a front elevational view of the steer head attachment of this invention; and FIG. 5 is a sectional view illustrating the steer head attachment of this invention mounted on the handlebars structure of a tricycle.

SUMMARY OF THE INVENTION

Figure 1:
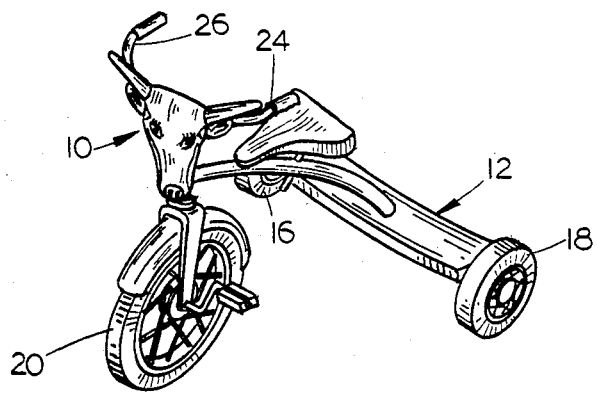
FIG. 1 is a perspective view of a tricycle having the steer head attachment of this invention mounted thereon.
Figure 2:
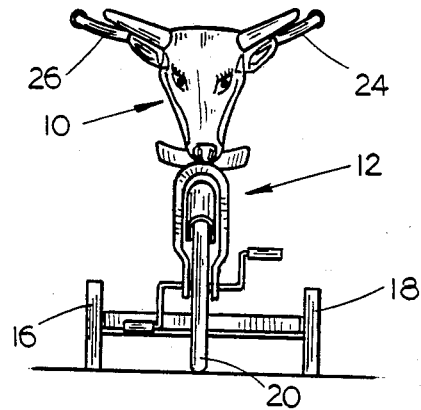
FIG. 2 is a front view of the invention mounted on a tricycle.
Figure 3:
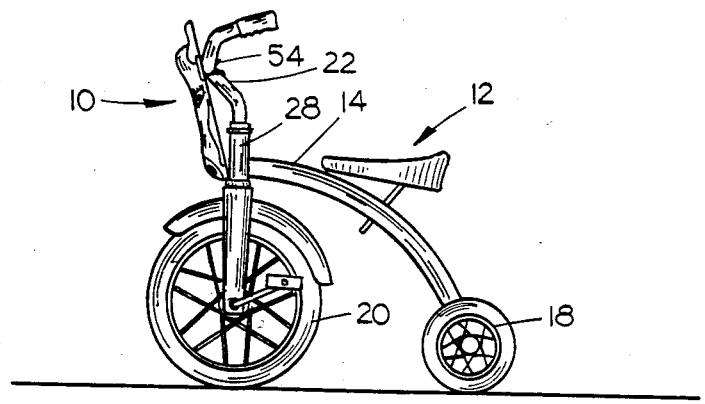
FIG. 3 is a side view of the invention mounted on a tricycle.

A steer head attachment for a tricycle is described comprising a molded shell of fiberglass or plastic wherein the front of the attachment has the shape and design of a steer head with horns protruding upwardly and laterally therefrom. A pair of spring clips are mounted on the rear side of the attachment for removable connection to the handlebar structure of the tricycle.

DESCRIPTION OF THE PREFERRED EMBODIMENT

The steer head attachment of this invention is referred to generally by the reference numeral 10 while the reference numeral 12 refers to a conventional tricycle. Although the preferred embodiment of the invention 10 is that the front appearance of the same resembles a steer head having horns, other types of bovine animals could also be used. Further, although the attachment is preferably mounted on a tricycle, it could also be mounted on other types of velocipedes.

Tricycle 12 includes a frame means 14 having a pair of rear wheels 16 and 18 and a front wheel 20. A handlebar structure 22 is operatively connected to the wheel 20 for steering the same. Handlebar structure 22 includes a pair of handlebars 24 and 26 which extend upwardly, outwardly and forwardly from the fork 28 of the tricycle.

Attachment 10 includes a front portion 30, back portion 32, upper portion 34, and lower portion 34. Preferably, attachment 10 is comprised of a molded fiber glass or plastic material and has the color and configuration of a steer head. As seen in the drawings, attachment 10 includes a pair of eyes 38 and 40, nose 42, horns 44 and 46, and ears 48 and 50.

A pair of spring clips 52 and 54 are secured to the rearward side of the attachment 10 in a horizontally spacedapart manner and are adapted to be removably secured to handlebars 24 and 26 respectively. When the attachment 10 is mounted on the tricycle as illustrated in FIG. 5, the lower portion thereof engages the upper end of the fork 28.

The steer head attachment 10 of this invention may be quickly and easily mounted on the handlebars 24 and 26 of the tricycle 12 by means of the spring clips 52 and 54. When the attachment is mounted on the tricycle, the horns 44 and 46 extend generally in the same plane as the handlebars 24 and 26. When the attachment is mounted on the tricycle, the attachment gives the child riding the tricycle the feeling that he is riding a steer or the like.

It can therefore be seen that the invention accomplishes at least all of its stated objectives.

I claim:

1. In combination:
a velocipede having a forward and at least one rearward wheel,
said forward wheel being mounted in a fork member and rotatable therein,
said fork member mounted for steerable movement on the forward end of said velocipede,
a center post extending upwardly from the upper end of said fork member for holding a handlebar structure,
a handlebar structure mounted on said center post for steering said velocipede,
said handlebar structure including right and left generally horizontal handlebars attached to said center post,
an ornamental steer head having means for removably attaching said head to said handlebar structure, said removable attaching means including right and left spring clips affixed to the rearward side of said head and removably connected to said right and left handlebar, respectively,
said steer head having right and left horn positions extending outwardly from said head parallel and adjacent to said right and left handlebar, respectively, and
said steer head having a nose portion located lowermost on said head, said nose portion being in contact with the upper end of said fork member at the junction of said center post with said fork member.

2. In combination:
a velocipede having a movable handlebar structure thereon for steering the same,
a movable fork member on the forward end of said velocipede, for holding a rotatable forward wheel, a center post connected to the upper end of said fork member for holding said handlebar structure, said handlebar structure including right and left generally horizontal handlebars attached to said center post, and an ornamental bovine head having right and left spring clips affixed to the rearward side thereof, said spring clips adapted for removable attachment to said right and left handlebars, said head being in the form of a steer head having right and left horns, the right and left horns thereof extending outwardly from said head generally parallel to said right and left handlebars, respectively.

* * * * *